United States Patent [19]
Taguchi et al.

[11] Patent Number: 5,872,754
[45] Date of Patent: Feb. 16, 1999

[54] DATA REPRODUCTION APPARATUS

[75] Inventors: Masakazu Taguchi; Michio Matsuura; Yoshihide Fujita; Akihiro Itakura, all of Kanagawa, Japan

[73] Assignee: Fujitsu Limited, Kawasaki, Japan

[21] Appl. No.: 799,895

[22] Filed: Feb. 13, 1997

[30] Foreign Application Priority Data

Oct. 3, 1996 [JP] Japan .................................. 8-263346

[51] Int. Cl.⁶ ..................................................... G11B 7/00
[52] U.S. Cl. ................... 369/59; 369/58; 369/47
[58] Field of Search ................... 369/59, 58, 47, 369/48, 49, 50, 124, 32; 360/48, 51, 39

[56] References Cited

U.S. PATENT DOCUMENTS 5,559,777  9/1996  Maeda et al. ......................... 369/58 X

FOREIGN PATENT DOCUMENTS

3144919  6/1991  Japan .
479031   3/1992  Japan .
887828   4/1996  Japan .

*Primary Examiner*—Muhammad N. Edun
*Attorney, Agent, or Firm*—Greer, Burns & Crain, Ltd.

[57] ABSTRACT

A data reproduction apparatus assuring compatibility of optical disks capable of reproducing both pit-position recorded data and edge-position recorded data in optical disks by digital operation by using digital values obtained by sampling reproduction signals. A reproduction signal obtained by an optical head is converted into a digital value by a first A/D converter, and on the basis of the converted digital value, pit-position recorded data is recorded by a pit-position detector. Moreover, the reproduction signal obtained by the optical head is converted into digital values by first and second A/D converters, and on the basis of the converted digital values, front edge and rear edge maximum likelihood decoded data of edge-position recorded data are detected by first and second maximum likelihood detectors, and both maximum likelihood decoded data are synthesized by a synthesizer.

9 Claims, 8 Drawing Sheets

SYNCHRONOUS SHIFT
MINUS DIRECTION

FIG. 6B

SYNCHRONOUS TO
CORRECT POSITION

FIG. 6C

SYNCHRONOUS SHIFT
PLUS DIRECTION

FIG. 7

FIG. 8

DATA REPRODUCTION APPARATUS

BACKGROUND OF THE INVENTION

1. Field of the Invention

The present invention relates to an apparatus for reproducing data recorded in optical disk.

2. Description of the Prior Art

The optical disk is nowadays an essential external storage medium to computers. It is known that the recording system for optical disks has two kinds: one is a pit-position recording system and the other is an edge-position recording system. The pit-position recording system has record data corresponding to the center of a written record pit, and the edge-position recording system has record data corresponding to each edge of a record pit, which is known to be more advantageous than the pit-position recording system in that it can store a greater quantity of information per unit region and have greater recording density.

The optical disk, whether it is based on either recording system, requires a data reproduction apparatus. The data reproduction apparatus must recognize which recording system the optical disk is based on. To this end, JAP3-144919 and JAP4-79031 propose a compatible data reproduction apparatus which can be used when the optical disk is based on either recording system.

JAP3-144919 obtains a distinguishing information from the optical disk or from the outside whereby either recording system is identified. As a result, the data is reproduced in an analog system suited to the identified recording system. JAP4-79031 is also directed to the identifying of either of recording systems, and provides a method for identifying "which system" by a mark physically made on the optical disk such as the casing. When the optical disk is loaded on an apparatus, the mark functions as a distinguisher, thereby recognizing that the optical disk is based on a pit-position record system or an edge-position record system. The data is reproduced in an analog system suited to the identified recording system. A common feature with these conventional reproduction apparatus is that they presuppose that the data is reproduced in an analog system.

The analog reproducing system inherent to them makes it impossible for a PRML (partial response maximum likelihood) to be applied to, which will be described in greater detail below.

As a new reproducing system of edge-position recorded data, a digital data reproducing technology called PRML (partial response maximum likelihood) is being studied. This PRML reproducing technology is a technology for demodulating the information modulated and recorded in accordance with partial response characteristic by a maximum likelihood method (Viterbi decoding), and it is superior in the detection capability to the conventional analog reproducing system. First, record data is limited in run length, and the signal modulated in accordance with the partial response characteristic is recorded in an optical disk, and a reproduction signal obtained from the optical disk is sampled by an analog/digital (A/D) converter, and the transition of most likely (maximum likelihood) signal state determined from the sampling value according to a predetermined algorithm, and the reproduction data is generated on the basis of the determined transition of signal state. At this time, maximum likelihood decoded data of front edge and maximum likelihood decoded data of rear edge are independently detected, and the individual maximum likelihood decoded data are synthesized, and data is demodulated.

This PRML reproducing technology is a digital detecting system for operating by using the sampling value, and is completely different from the analog detecting system in the conventional reproduction apparatus mentioned above. Therefore, in such conventional reproduction apparatus, the problem is that the PRML reproducing system which is excellent in detection capability cannot be applied.

Incidentally, in the above detecting system of PRML reproducing technology, a system of reproducing pit-position recorded data by utilizing one side of front edge or rear edge, that is, a pit-position detecting system by applying the PRML has been proposed. In this system, pit-position recorded data can be reproduced, but a sufficient margin is not obtained. The reason is explained below.

Figure 1:
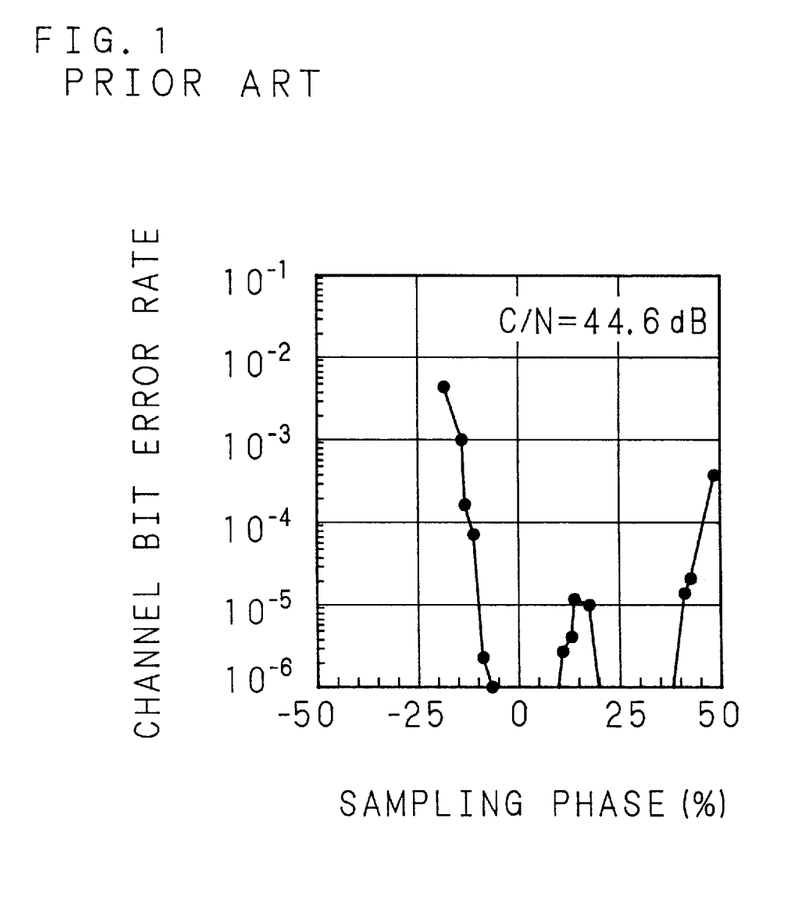
FIG. 1 is a graph showing the result of experiment of pit-position reproduction in a prior art.

FIG. 1 is a graph showing the result of experiment of error rate in the case of reproduction of pit-position recorded data by three-value two-state PR (1, 1) ML. When the sampling phase is near +15%, the error rate is worse than $10^{-5}$. When the error rate allowable range is $10^{-5}$ or less, the phase margin is only about 25%, which is not suited to practical use. The reason of such worsening the error rate is the presence of the transition region of the detection state at this phase position.

Figure 2:
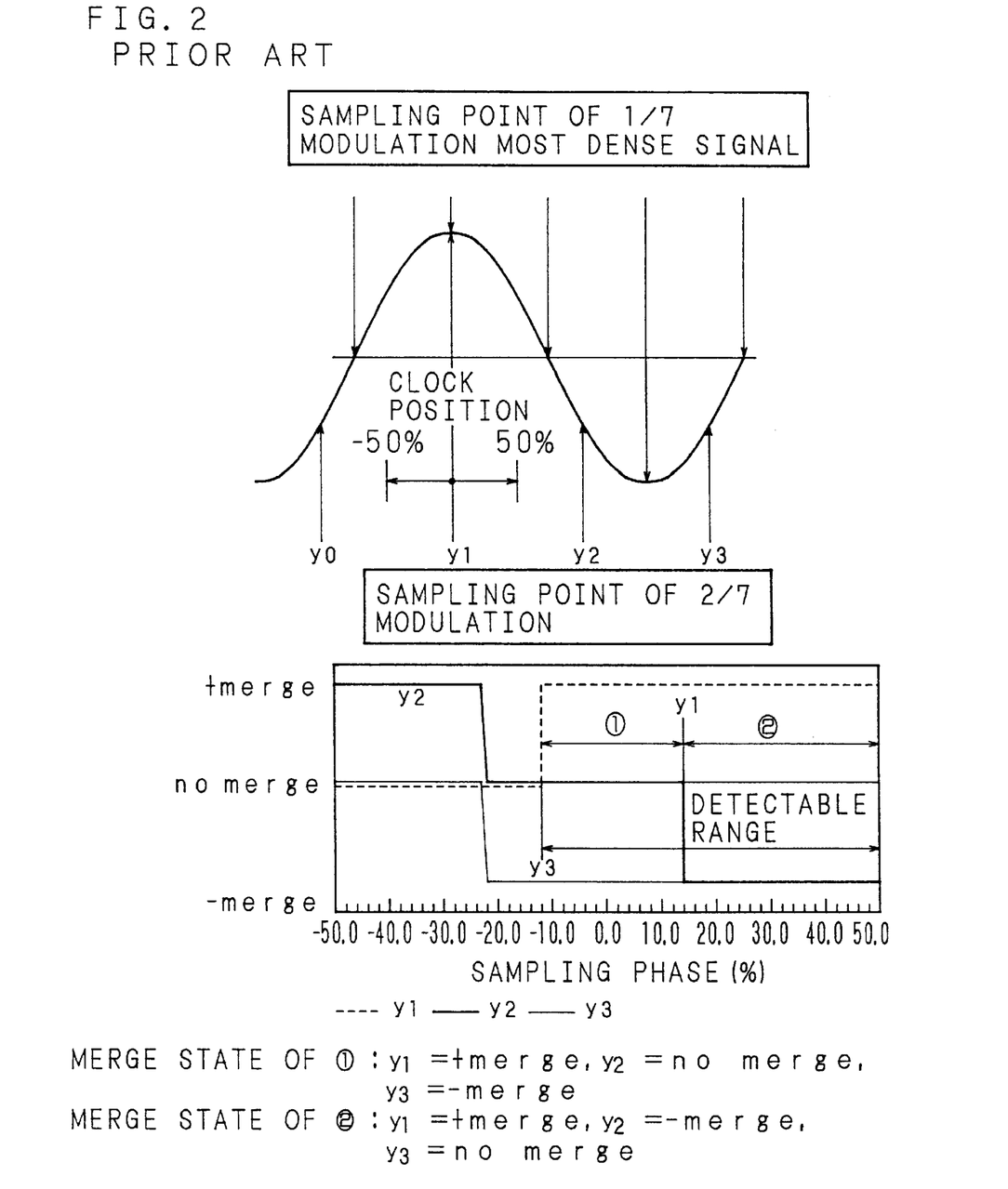
FIG. 2 is a graph showing the detection state of pit position in a prior art.

FIG. 2 is a graph showing the pit-position detecting state by three-value two-state PR (1, 1) ML. The merge state ① in the detectable range is y1=+merge, y2=no merge, y3=merge and the merge state ② is y1=+merge, y2=−merge, y3=no merge and at the turning point from the merge state ① to ② (the sampling phase in the vicinity of +15%), the merge states coexist due to noise, and data may not be detected correctly.

Or, if attempted to install the pit-position detecting system by analog configuration in the detecting system of PRML reproducing technology by digital configuration, since only few circuits can be shared, sufficient reduction of size and saving of power are not achieved on the whole.

BRIEF SUMMARY OF THE INVENTION

It is hence an object of the invention to present a data reproduction apparatus capable of reproducing both pit-position recorded data and edge-position recorded data by digital operation.

It is another object of the invention to present a data reproduction apparatus compatible for both pit-position recorded data and edge-position recorded data even when the PRML reproducing technology is employed in the edge-position recorded data.

It is a further object of the invention to present a data reproduction apparatus capable of obtaining a wider phase margin as compared with the conventional apparatus for reproducing pit-position recorded data by using the maximum likelihood detector at one side of the reproduction apparatus for edge position.

It is a different object of the invention to present a data reproduction apparatus capable of reproducing both edge-position recorded data and pit-position recorded data only by adding a few digital circuits to a reproduction apparatus for edge position of conventional digital configuration.

It is another object of the invention to present a data reproduction apparatus for reproducing data pit-position recorded in an optical disk by digital operation using the digital value obtained by sampling a reproduction signal.

A data reproduction apparatus according to a first aspect of the invention comprises means for obtaining a reproduction waveform from an optical disk, means for converting the obtained reproduction waveform into a digital value, first detecting means for detecting pit-position recorded data on the basis of the converted digital value, and second detecting means for detecting edge-position recorded data on the basis of the converted digital value.

A data reproduction apparatus according to a second aspect of the invention comprises means for obtaining a reproduction waveform from an optical disk, means for generating a synchronizing clock signal, sampling means for obtaining a sampling value from the reproduction waveform in synchronism with the generated synchronizing clock signal, first detecting means for detecting pit-position recorded data on the basis of the obtained sampling value, and second detecting means for detecting edge-position recorded data on the basis of the obtained sampling value.

A data reproduction apparatus according to a third aspect of the invention relates to the first or second aspect, wherein the second detecting means detects the edge-position recorded data by the maximum likelihood detecting system.

A data reproduction apparatus according to a fourth aspect of the invention relates to the second or third aspect, further comprising means for detecting a phase error of the synchronizing clock signal and the point for obtaining the sampling value from the reproduction waveform, and means for correcting the detected phase error commonly used when reproducing the pit-position recorded data and the edge-position recorded data.

A data reproduction apparatus according to a fifth aspect of the invention relates to any one of the first to fourth aspects, further comprising recognizing means for recognizing the data recorded in the optical disk whether pit-position recorded data or edge-position recorded data, and means for selecting the output of either first detecting means or second detecting means on the basis of the recognition result by the recognizing means.

A data reproduction apparatus according to a sixth aspect of the invention comprises means for obtaining a reproduction waveform from an optical disk, means for converting the obtained reproduction waveform into a digital value, and means for detecting pit-position recorded data on the basis of the converted digital value.

In the invention, the reproduction signal reproduced from the optical disk is converted into a digital signal, and by digital operation on the basis of the digital value, pit-position recorded data and edge-position recorded data are reproduced, and therefore media are compatible between pit-position recording and edge-position recording. In the PRML reproduction apparatus employed for enhancing the detecting capability of data recorded in the edge-position recording system introduced for enhancement of density, there are many common parts with the PRML system and data is detected by digital operation, and therefore by adding simple circuits to the conventional PRML system, not only edge-position recorded data but also pit-position recorded data can be reproduced.

The above and further objects and features of the invention will more fully be apparent from the following detailed description with the accompanying drawings.

DETAILED DESCRIPTION OF THE INVENTION

Referring now to the drawings, embodiments of the invention are described in detail below.

(First embodiment)

Figure 3:
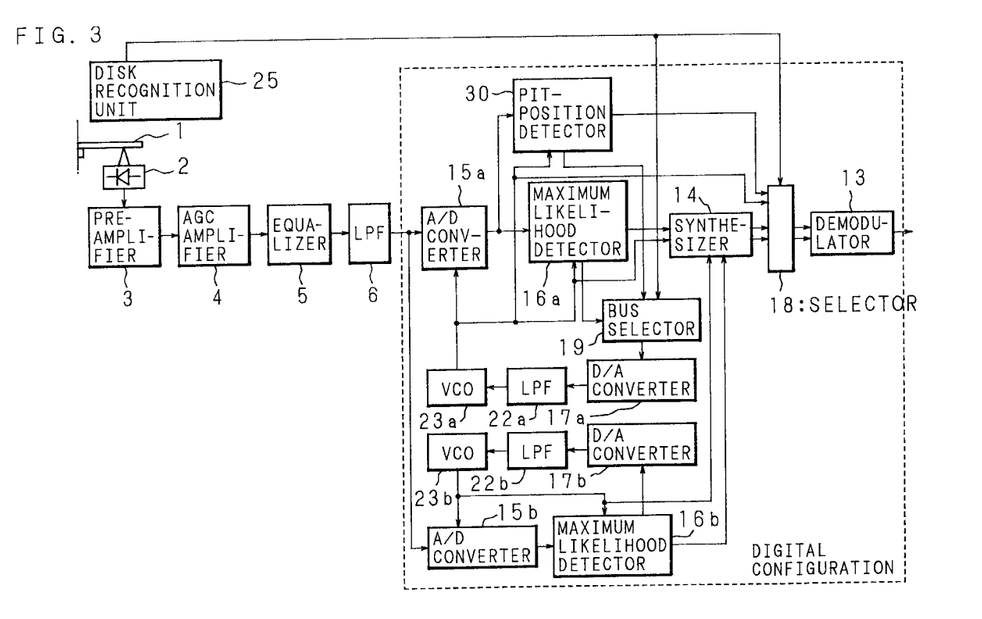
FIG. 3 is a block diagram of a first embodiment of the invention.

FIG. 3 is a diagram showing a constitution of a data reproduction apparatus in a first embodiment of the invention (an embodiment for reproducing pit-position recorded data and edge-position recorded data compatibly in a digital detecting system). In FIG. 3, reference numeral 1 denotes an optical disk in which data is recorded in pit-position system and/or edge-position system. The optical disk 1 may be any one of read-only optical disk, write-once optical disk, erasable type magneto-optical disk, or others.

Beneath the optical disk 1 is provided an optical head 2 for emitting a reproduction beam to the optical disk 1 and obtaining a reproduction signal of pit-position recorded data or edge-position recorded data from the reflected light, and the optical head 2 issues the reproduction signal to a pre-amplifier 3. The pre-amplifier 3 amplifies an input reproduction signal, and sends out to an AGC amplifier 4. The AGC amplifier 4 further amplifies the reproduction signal and sends it out to an equalizer 5. The equalizer 5 shapes the waveform of the amplified reproduction signal, and supplies into a low pass filter (LPF) 6. The LPF 6 cuts off higher frequency components than a specific frequency, and issues a reproduction signal of low frequency range into an A/D converter 15a for front edge and an A/D converter 15b for rear edge.

The A/D converter 15a samples the shaped reproduction signal, and issues the sampling value to a pit-position detector 30 and a maximum likelihood detector 16a for front edge. The pit-position detector 30 generates pit-position data and phase error data on the basis of the sampling value of the reproduction signal, and issues the pit-position data into a selector 18 and the phase error data to a bus selector 19. The maximum likelihood detector 16a generates front edge maximum likelihood decoded data and front edge phase error data on the basis of the sampling value of the reproduction signal, and issues the front edge maximum likelihood decoded data into a synthesizer 14 and the front edge phase error data to the bus selector 19. Moreover, from a disk recognition unit 25 for recognizing whether pit-position data or edge-position data is recorded in the optical disk 1, the recognition information is transferred to the selector 18 and bus selector 19.

The bus selector 19, according to the recognition information from the disk recognition unit 25, selects either the phase error data from the pit-position detector 30 or the front edge phase error data from the maximum likelihood detector 16a, and issues the data to a D/A converter 17a. The D/A converter 17a converts the phase error data or the front edge phase error data into a phase error signal, and supplies to an LPF 22a. The LPF 22a converts the phase error signal into a voltage level, and issues to a VCO 23a. The VCO 23a generates the same clock signal as synchronizing signal for data recording as a reference clock signal, controls the phase of the reference clock signal depending on the input voltage level, and issues the controlled clock signal to the A/D converter 15a, maximum likelihood detector 16a, pit-position detector 30, synthesizer 14, and selector 18. The A/D converter 15a, maximum likelihood detector 16a, and pit-position detector 30 operate in synchronism with this clock signal from the VCO 23a.

The A/D converter 15b samples the shaped reproduction signal, and issues the sampling value to a maximum likelihood detector 16b for rear edge. The maximum likelihood detector 16b generates rear edge maximum likelihood decoded data and rear edge phase error data on the basis of the sampling value of reproduction signal, and issues the rear edge maximum likelihood decoded data to the synthesizer 14 and the rear edge phase error data to a D/A converter 17b. The D/A converter 17b converts the rear edge phase error data into a phase error signal, and supplies it to an LPF 22b. The LPF 22b converts the phase error signal into a voltage level, and issues to a VCO 23b. The VCO 23b generates the same clock signal as the synchronizing signal for data recording as a reference clock signal, controls the phase of the reference clock signal depending on the input voltage level, and issues the controlled clock signal to the A/D converter 15b, maximum likelihood detector 16b, and synthesizer 14. The A/D converter 15b and maximum likelihood detector 16b operate in synchronism with this clock signal from the VCO 23b.

The synthesizer 14 synthesizes the front edge maximum likelihood decoded data from the maximum likelihood detector 16a and the rear edge maximum likelihood decoded data from the maximum likelihood detector 16b, and issues the synthesized data and clock to the selector 18. The selector 18 selects either the pit-position data from the pit-position detector 30 or the synthesized data from the synthesizer 14 depending on the recognition information from the disk recognition unit 25, and issues the selected data and clock to a demodulator 13. The demodulator 13 demodulates the input data, and produces final reproduction data.

Figure 4:
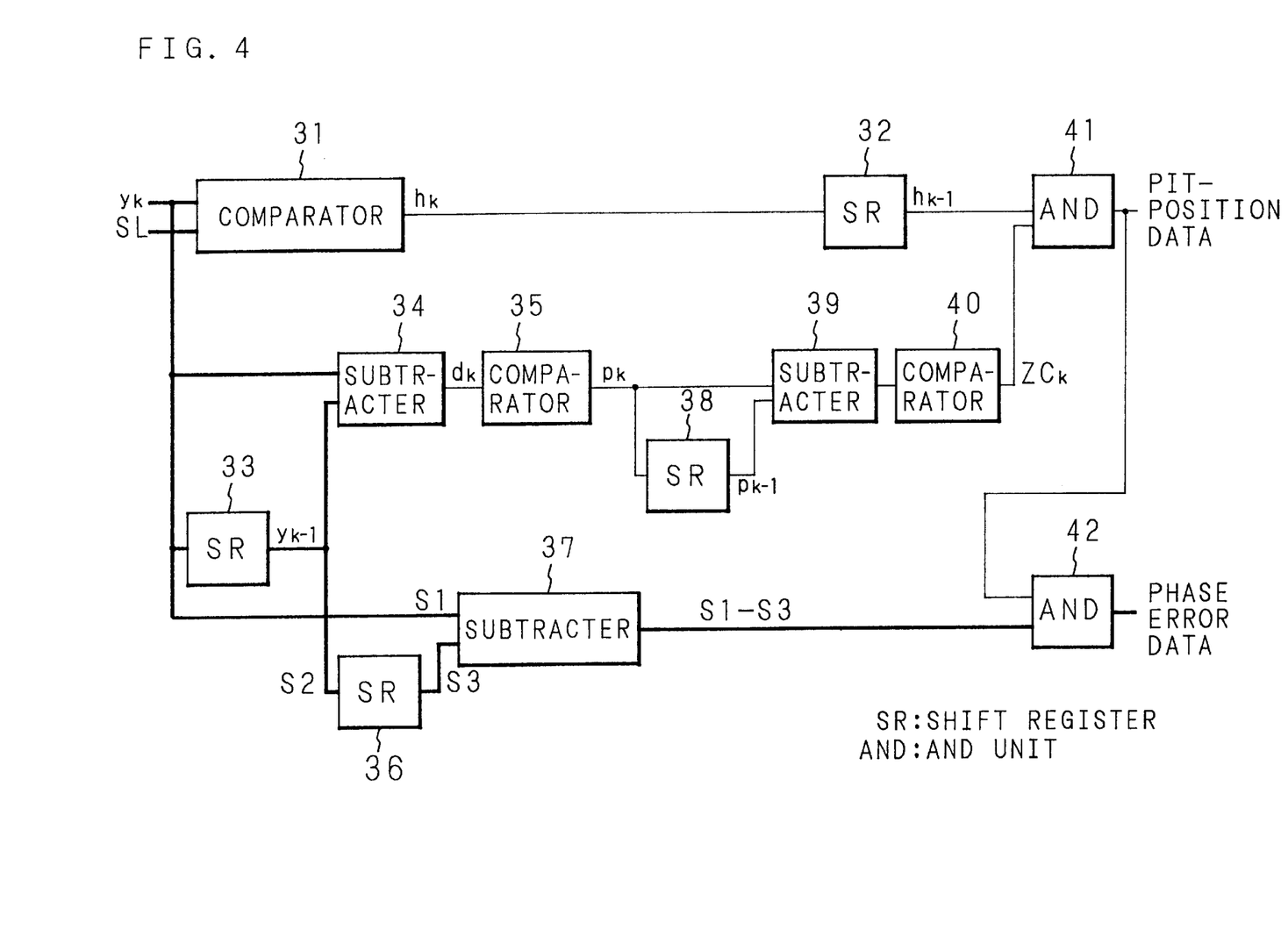
FIG. 4 is an internal structural diagram of a pit-position detector.

FIG. 4 is a diagram showing an internal structure of the pit-position detector 30. The thick line in FIG. 4 shows the bus line. The sampling value $y_k$ from the A/D converter 15a is fed into a comparator 31, a shift register (SR) 33, a subtracter 34, and a subtracter 37. The comparator 31 compares the input sampling value $y_k$ and predetermined slice level SL, and issues data $h_k$, either "1" if $Y_k$>SL or "0" if $Y_k \leq SL$, to a shift register 32. The shift register 32 issues the data $h_{k-1}$ delayed by 1 clock to an AND unit 41.

The shift register 33 delays the input sampling value by 1 clock and issues the obtained sampling value $Y_{k-1}$ to the subtracter 34 and a shift register 36. The subtracter 34 determines the difference $d_k$ of sampling values $y_k$ and $y_{k-1}$ (=$y_k - Y_{k-1}$), and issues to a comparator 35. The comparator 35 compares the input difference $d_k$ with 0, and issues $d_k$ polarity data $p_k$, either "1" if $d_k$>0 or "0" if $d_k \leq 0$, to a shift register 38 and a subtracter 39. The shift register 38 issues $d_k$ polarity data $p_{k-1}$ delayed by 1 clock to the subtracter 39. The subtracter 39 determines the difference of $d_k$ polarity data $p_k$ and $p_{k-1}$, and issues to a comparator 40. The comparator 40 compares the input difference with 0, and issues data $ZC_k$, either "1" if the difference is negative or "0" if not negative, to the AND unit 41.

The AND unit 41 determines the AND of the output of the shift register 32 and the output of the comparator 40, and issues the value as pit-position data to the selector 18, and also issues to an AND unit 42 in the pit-position detector 30.

The shift register 36 delays the input sampling value by 1 clock, and issues to the subtracter 37. The subtracter 37 determines the difference of two sampling values deviated by 2 clocks, and issues to the AND unit 42. The AND unit 42 determines the AND of the output of the AND unit 41 and the output of the subtracter 37, and issues the value as phase error data to the bus selector 19.

Figure 5:
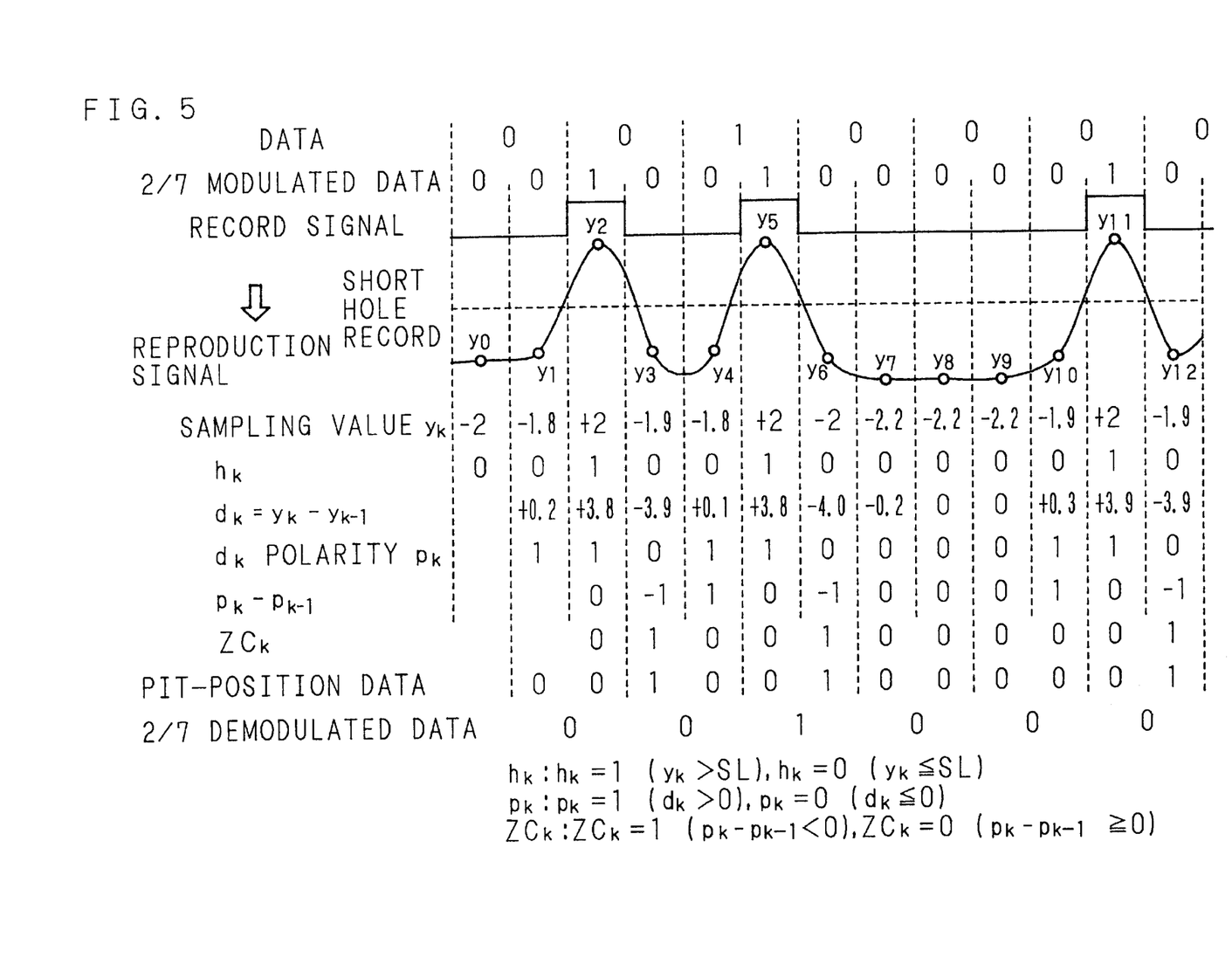
FIG. 5 is a diagram showing an example of signal processing in the invention.

The operation is described. First is explained the case of reproduction of pit-position data from the optical disk 1 in which data is pit-position recorded. FIG. 5 is a diagram showing a signal processing example in this case. In this case, the recognition information showing pit-position recording is transferred from the disk recognition unit 25 to the selector 18 and bus selector 19, and the selector 18 selects the output of the pit-position detector 30, and the bus selector 19 also selects the output of the pit-position detector 30.

The reproduction signal obtained from the optical disk 1 by the optical head 2 is amplified by the pre-amplifier 3 and AGC amplifier 4, and the reproduction waveform is shaped by the equalizer 5, and high frequency noise is removed by the LPF 6, and it is supplied to the A/D converter 15a.

In the A/D converter 15a, the sampling value of the reproduction signal is obtained in synchronism with the clock signal from the VCO 23a, and the obtained sampling value is supplied to the pit-position detector 30, and on the basis of these sampling values, the pit-position data and the phase error data are obtained. In the pit-position detector 30, the pit-position data and the phase error data are obtained in the following manner. The operation in this pit-position detector 30 is also done in synchronism with the clock signal from the VCO 23a.

The sampling value $y_k$ obtained in synchronism with the clock of the peak point of reproduction signal is compared with the predetermined level SL in the comparator 31. If $Y_k$>SL, the output $h_k$ of the comparator 31 is "1", and if $y_k \leq SL$, $h_k$ is "0". The $d_k$ polarity $p_k$ refers to the polarity of the difference $d_k$ of the sampling value $y_{k-1}$ delayed by 1 clock in the shift register 33 and $y_k$, and it is "1" if positive and "0" if negative. By determining the difference of $d_k$ polarity $p_k$ and $p_{k-1}$ deviated by 1 clock, the zero cross point $ZC_k$ is obtained. Since $ZC_k$ is delayed by 1 clock, $h_k$ is delayed by 1 clock in the shift register 32. The pit-position data issued to the demodulator 13 is obtained by calculating the product (AND) of $h_{k-1}$ and $ZC_k$.

Figure 6A:
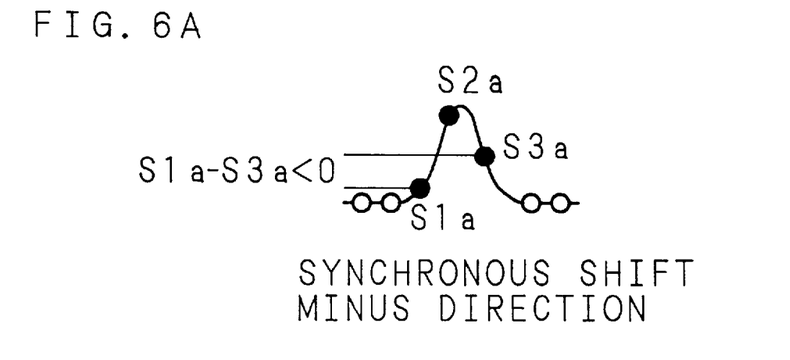
FIGS. 6A, 6B, 6C are diagrams for explaining the principle of clock synchronism.
Figure 6B:
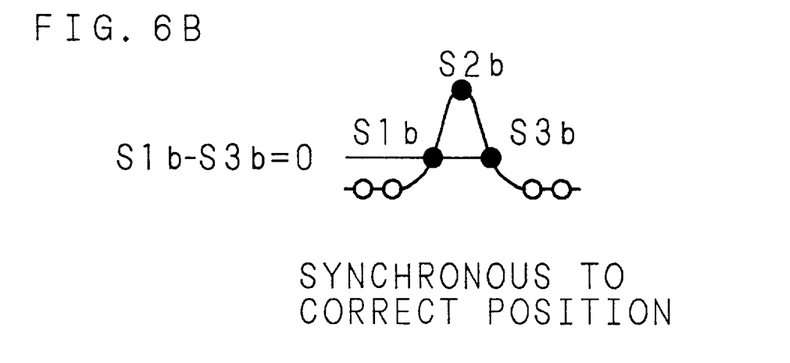
Figure 6C:
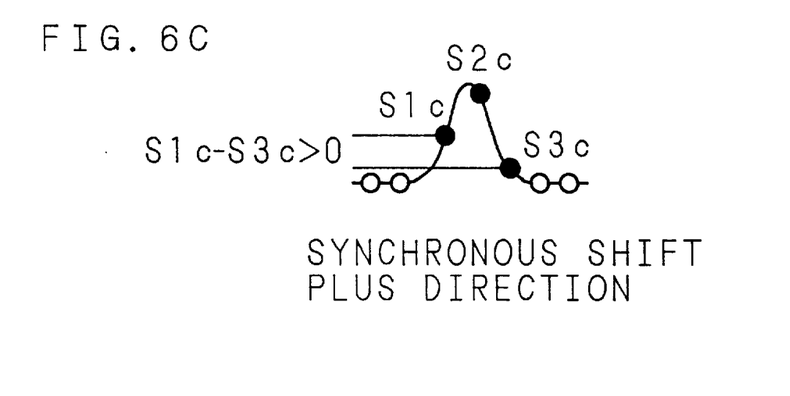

Extraction of phase synchronizing signal in the first embodiment is described below while referring to FIGS. 6A, 6B, 6C showing the principle of clock synchronism. FIG. 6B shows a case of correct synchronism, in which sampling values S1b and S3b before and after data point (sampling value S2b) are the same values. On the other hand, when the synchronism is deviated to the minus side as shown in FIG. 6A, S1a–S1c is negative. Or when the synchronism is deviated to the plus side as shown in FIG. 6C, S1c–S3c is positive. Therefore, the polarity of such difference or its value can be utilized in phase error data. In a structural example of pit-position detector 30 shown in FIG. 4, the product (AND) of the difference (S1–S3) and output data is determined, and this product is issued as phase error data.

In the constitution shown in FIG. 4, the same effect is obtained by using a selector operating similarly instead of the AND unit 42.

The phase error data issued from the pit-position detector 30 is selected by the bus selector 19, and is put into the D/A converter 17a, and is converted into a phase error signal. The phase error signal is further converted to a voltage level by the LPF 22a. Depending on the converted voltage level, the phase of the reference clock signal is adjusted in the VCO 23a, and the adjusted clock signal is supplied into the A/D converter 15a and pit-position detector 30, and they are operated on clock synchronism.

The pit position data obtained in the pit-position detector 30 is selected by the selector 18, and is put into the demodulator 13, and is demodulated into the original record data.

Figure 7:
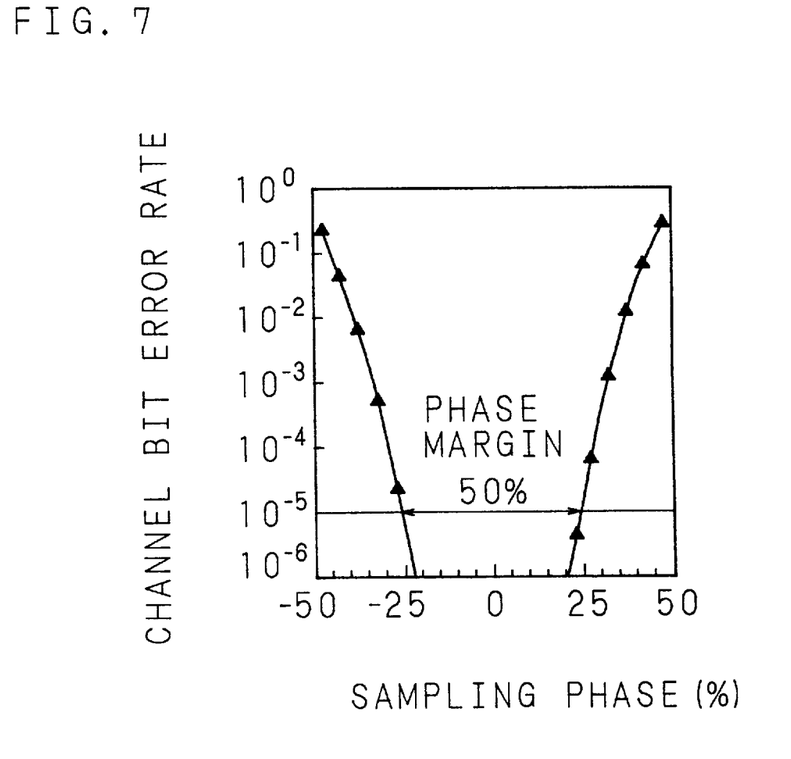
FIG. 7 is a graph showing the simulation result of phase margin in the first embodiment.

FIG. 7 is a graph showing simulation result of reproduction operation of pit-position data in the first embodiment. When the allowable range of the error rate is defined at $10^{-5}$ or less same as in the prior art, a phase margin of about 50% notably improved from the prior art (FIG. 1) is obtained, and it is sufficiently practicable. Thus, in the invention, since a wider phase margin than in the prior art is obtained, the yield of manufacturing the apparatus can be enhanced.

Next is explained a case of reproducing edge-position data from the optical disk 1 in which data is edge-position recorded. In this case, the recognition information showing edge-position recording is transferred from the disk recognition unit 25 to the selector 18 and bus selector 19, and the selector 18 selects the output of the synthesizer 14, and the bus selector 19 selects the output of the maximum likelihood detector 16a.

The reproduction signal obtained from the optical disk 1 by the optical head 2 is amplified by the pre-amplifier 3 and AGC amplifier 4, and the reproduction waveform is shaped by the equalizer 5, and high frequency noise is removed by the LPF 6, and it is supplied to the A/D converter 15a and A/D converter 15b.

In the A/D converter 15a, the reproduction signal is sampled, and the obtained digital signal is issued to the maximum likelihood detector 16a. In the maximum likelihood detector 16a, the front edge maximum likelihood decoded data and the front edge phase error data are obtained, and the former is issued to the synthesizer 14 and the latter to the bus selector 19. The front edge phase error data selected in the bus selector 19 is converted into an analog phase error signal in the D/A converter 17a, and this phase error signal is converted into a voltage level in the LPF 22a. In the VCO 23a, a clock signal depending on the voltage level is generated, and is issued to the A/D converter 15a, maximum likelihood detector 16a and synthesizer 14. They operate on the basis of this clock signal. On the other hand, the reproduction signal is sampled in the A/D converter 15b, and the obtained digital signal is issued to the maximum likelihood detector 16b. In the maximum likelihood detector 16b, the rear edge maximum likelihood decoded data and the rear edge phase error data are obtained, and the former is issued to the synthesizer 14 and the latter to the D/A converter 17b. The rear edge phase error data is converted into an analog phase error signal in the D/A converter 17b, and this phase error signal is converted into a voltage level in the LPF 22b. In the VCO 23b, a clock signal depending on the voltage level is generated, and is issued to the A/D converter 15b, maximum likelihood detector 16b, and synthesizer 14. They operate on the basis of this clock signal.

The front edge maximum likelihood decoded data and the rear edge maximum likelihood decoded data are synthesized in the synthesizer 14, and the synthesized data is selected by the selector 18 and is put into the demodulator 13. The synthesized data entering the demodulator 13 is demodulated into the original record data.

In the structural example shown in FIG. 3, the pit-position data is detected by using the sampled digital value by the A/D converter 15a for the front edge, but it is of course possible to obtain the digital value for use in detection of pit-position data by the A/D converter 15b for rear edge.

(Second embodiment)

Figure 8:
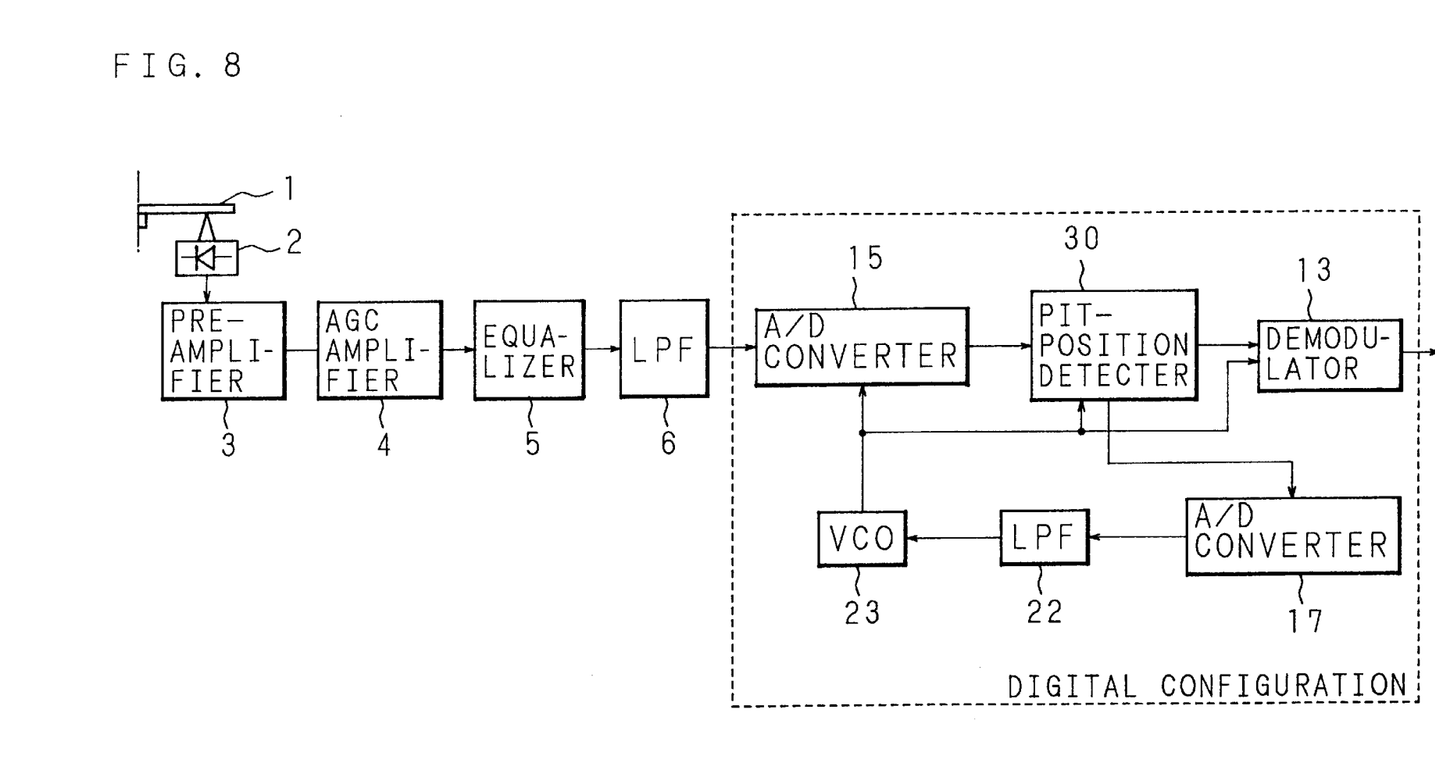
FIG. 8 is a block diagram of a second embodiment of the invention.

FIG. 8 is a diagram showing a constitution of a data reproduction apparatus in a second embodiment of the invention (an embodiment of reproducing pit-position recorded data by a digital detecting system alone). In FIG. 8, reference numeral 1 denotes an optical disk in which data is recorded in pit-position system. The optical disk 1 may be any one of read-only optical disk, write-once optical disk, erasable type magneto-optical disk, or others.

Beneath the optical disk 1 is provided an optical head 2 for emitting a reproduction beam to the optical disk 1 and obtaining a reproduction signal of pit-position recorded data from the reflected light, and the optical head 2 issues the reproduction signal to a pre-amplifier 3. The pre-amplifier 3 amplifies an input reproduction signal, and sends out to an AGC amplifier 4. The AGC amplifier 4 further amplifies the reproduction signal and sends out to an equalizer 5. The equalizer 5 shapes the waveform of the amplified reproduction signal, and supplies into an LPF 6. The LPF 6 cuts off higher frequency components than a specific frequency, and issues a reproduction signal of low frequency range into an A/D converter 15. The A/D converter 15 samples the shaped reproduction signal, and issues the sampling value to a pit-position detector 30.

The pit-position detector 30 generates pit-position data and phase error data on the basis of the sampling value of the reproduction signal, and issues the pit-position data into a demodulator 13 and the phase error data to a D/A converter 17. The demodulator 13 demodulates the pit-position data, and produces final reproduction data.

The D/A converter 17 converts the phase error data into a phase error signal, and supplies to all LPF 22. The LPF 22 converts the phase error signal into a voltage level, and issues to a VCO 23. The VCO 23 generates a same clock signal as synchronizing signal for data recording as a reference clock signal, controls the phase of the reference clock signal depending on the input voltage level, and issues the controlled clock signal to the A/D converter 15, pit-position detector 30, and demodulator 13. The A/D converter 15, pit-position detector 30, and demodulator 13 operate in synchronism with this clock signal from the VCO 23.

The internal structure of the pit-position detector 30 in the second embodiment is same as in the first embodiment (FIG. 4), and its explanation is omitted.

The operation is described below. The reproduction signal obtained by the optical head 2 from the optical disk 1 in which data is pit-position recorded is amplified by the pre-amplifier 3 and AGC amplifier 4, the reproduction waveform is shaped by the equalizer 5, high frequency noise is removed by the LPF 6, and it is supplied into the A/D converter 15.

The sampling value of reproduction signal is obtained in synchronism with the clock signal from the VCO 23 in the A/D converter 15, and the obtained sampling value is supplied into the pit-position detector 30, and on the basis of these sampling values, the pit-position data and the phase error data are obtained. In this case, the processing operation in the pit-position detector 30 is same as in the first embodiment, and explanation is omitted. The operation in this pit-position detector 30 is done in synchronism with the clock signal from the VCO 23.

The phase error data from the pit-position detector 30 is put into the D/A converter 17, and is converted into a phase error signal. The phase error signal is further converted into a voltage level by the LPF 22. Depending on the converted voltage level, the phase of the reference clock signal is adjusted in the VCO 23, and the adjusted clock signal is supplied into the A/D converter 15, pit-position detector 30, and demodulator 13, and they are operated in clock synchronism. The pit-position data obtained in the pit-position detector 30 is put into the demodulator 13, and is demodulated into the original record data.

Thus, in the invention, since the pit-position recorded data is detected by digital operation, pit-position data can be reproduced by addition of few digital circuits to the system configuration of the PRML employed for enhancing the detecting capability in edge-position recording introduced for enhancing the recording density, and medium compatibility for both recording systems of optical disks is realized, and it is effective to contribute to reduction of size and saving of power consumption.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A data reproduction apparatus for reproducing pit-position recorded data and edge-position recorded data in an optical disk, comprising:
    means for obtaining a reproduction waveform from the optical disk;
    means for converting the obtained reproduction waveform into a digital value;
    first detecting means for detecting the pit-position recorded data on the basis of the converted digital value; and
    second detecting means for detecting the edge-position recorded data on the basis of the converted digital value.

2. A data reproduction apparatus of claim 1, wherein said second detecting means detects the edge-position recorded data by maximum likelihood detecting system.

3. A data reproduction apparatus of claim 1, further comprising:
    recognizing means for recognizing the data recorded in the optical disk whether pit-position recorded data or edge-position recorded data; and
    means for selecting the output of either first detecting means or second detecting means on the basis of the recognition result by said recognizing means.

4. A data reproduction apparatus for reproducing pit-position recorded data and edge-position recorded data in an optical disk, comprising:
    means for obtaining a reproduction waveform from the optical disk;
    means for generating a synchronizing clock signal;
    sampling means for obtaining a sampling value from the reproduction waveform in synchronism with the generated synchronizing clock signal;
    first detecting means for detecting the pit-position recorded data on the basis of the obtained sampling value; and
    second detecting means for detecting the edge-position recorded data on the basis of the obtained sampling value.

5. A data reproduction apparatus of claim 4, wherein said second detecting means detects the edge-position recorded data by maximum likelihood detecting system.

6. A data reproduction apparatus of claim 5, further comprising:
    means for detecting a phase error of the synchronizing clock signal and the point for obtaining the sampling value from the reproduction waveform; and
    means for correcting the detected phase error commonly used when reproducing the pit-position recorded data and the edge-position recorded data.

7. A data reproduction apparatus of claim 4, further comprising:
    means for detecting a phase error of the synchronizing clock signal and the point for obtaining the sampling value from the reproduction waveform; and
    means for correcting the detected phase error commonly used when reproducing the pit-position recorded data and the edge-position recorded data.

8. A data reproduction apparatus of claim 4, further comprising:
    recognizing means for recognizing the data recorded in the optical disk whether pit-position recorded data or edge-position recorded data; and
    means for selecting the output of either first detecting means or second detecting means on the basis of the recognition result by said recognizing means.

9. A data reproduction apparatus for reproducing pit-position recorded data in an optical disk, comprising:
    means for obtaining a reproduction waveform from the optical disk;
    means for converting the obtained reproduction waveform into a digital value; and
    means for detecting the pit-position recorded data on the basis of the converted digital value.

* * * * *